United States Patent
Gummadi et al.

(10) Patent No.: US 11,510,039 B2
(45) Date of Patent: Nov. 22, 2022

(54) DEVICE-TO-DEVICE COMMUNICATION INDICATOR

(71) Applicant: QUALCOMM Incorporated, San Diego, CA (US)

(72) Inventors: Bapineedu Chowdary Gummadi, Hyderabad (IN); Ramprasad Majjari, Nellore (IN); Lekhya Pavani Godavarthi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 16/949,483

(22) Filed: Oct. 30, 2020

(65) Prior Publication Data
US 2022/0141633 A1 May 5, 2022

(51) Int. Cl.
| | |
|---|---|
| *H04W 4/70* | (2018.01) |
| *H04W 76/14* | (2018.01) |
| *H04W 4/40* | (2018.01) |
| *H04W 8/00* | (2009.01) |
| *H04W 8/24* | (2009.01) |
| *H04W 74/08* | (2009.01) |
| *H04W 92/18* | (2009.01) |

(52) U.S. Cl.
CPC ............... *H04W 4/70* (2018.02); *H04W 4/40* (2018.02); *H04W 8/005* (2013.01); *H04W 8/24* (2013.01); *H04W 74/0808* (2013.01); *H04W 76/14* (2018.02); *H04W 92/18* (2013.01)

(58) Field of Classification Search
CPC ..... H04L 41/5058; H04L 67/51; H04L 67/75; H04M 1/72406; H04W 4/40–48; H04W 4/70; H04W 8/005; H04W 8/24; H04W 8/245; H04W 36/0022; H04W 36/14; H04W 40/24; H04W 48/16; H04W 60/06; H04W 74/0808–0825; H04W 76/14; H04W 76/16; H04W 84/18; H04W 92/18
See application file for complete search history.

(56) References Cited

U.S. PATENT DOCUMENTS

| | | | |
|---|---|---|---|
| 2010/0304674 A1* | 12/2010 | Kim | H04W 76/10 455/41.2 |
| 2019/0357033 A1 | 11/2019 | Cheng et al. | |
| 2020/0107236 A1 | 4/2020 | Tseng et al. | |

FOREIGN PATENT DOCUMENTS

WO  2020168080 A1  8/2020

OTHER PUBLICATIONS

International Search Report and Written Opinion—PCT/US2021/071517—ISA/EPO—dated Jan. 18, 2022.
(Continued)

*Primary Examiner* — Thomas R Cairns
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine a device-to-device communication link connection, of a plurality of potential device-to-device communication link connections, of the UE. The UE may provide, for display, a device-to-device communication indicator identifying the device-to-device communication link connection. Numerous other aspects are provided.

30 Claims, 11 Drawing Sheets

700 →

730: NR-V2X active

Primary UE 120

740: V2X active

Primary UE 120

750: NR-V2X active with Carrier Aggregation

Primary UE 120

(56) References Cited

OTHER PUBLICATIONS

Jeong S., et al., "A Hybrid V2X System for Safety-Critical Applications in VANET", 2016 IEEE 4th International Conference on Cyber-Physical Systems, Networks, and Applications (CPSNA), IEEE, Oct. 6, 2016 (Oct. 6, 2016), pp. 13-18, XP033029797, DOI: 10.1109/CPSNA.2016.11 [retrieved on Dec. 22, 2016] pp. 13-15, paragraphs I, II.

* cited by examiner

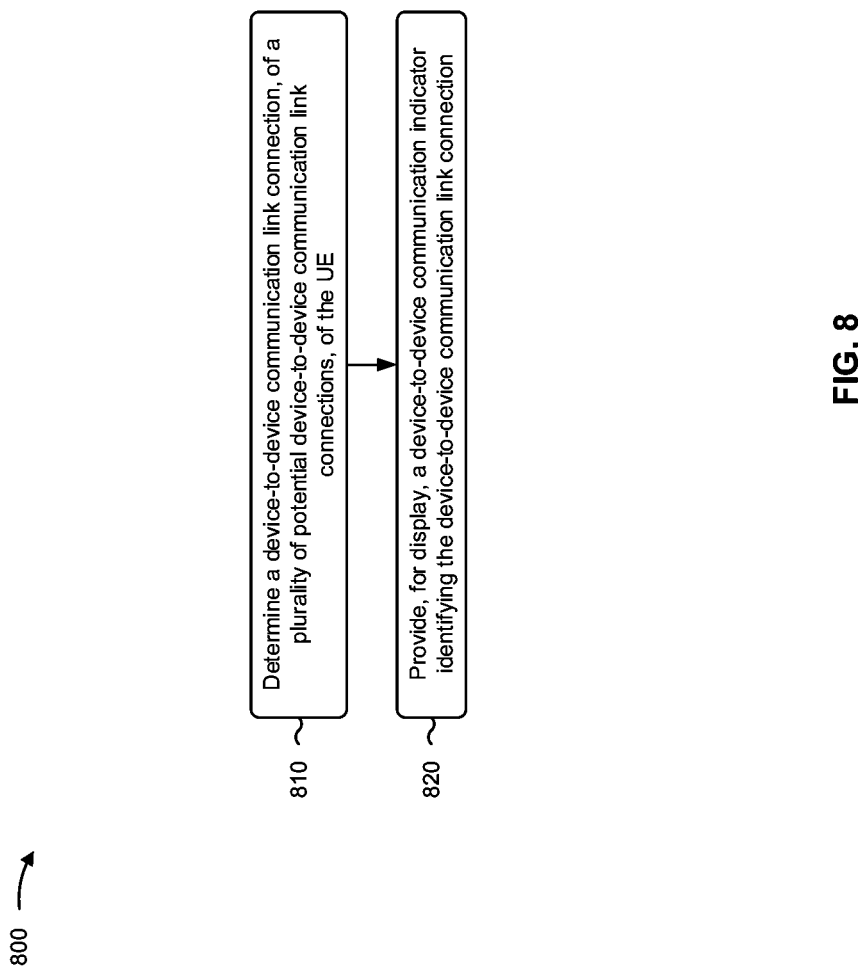

DEVICE-TO-DEVICE COMMUNICATION INDICATOR

FIELD OF THE DISCLOSURE

Aspects of the present disclosure generally relate to wireless communication and to techniques and apparatuses for device-to-device communication indicator.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a device-to-device communication link connection, of a plurality of potential device-to-device communication link connections, of the UE; and providing, for display, a device-to-device communication indicator identifying the device-to-device communication link connection.

In some aspects, a user equipment (UE) for wireless communication includes a memory; and one or more processors operatively coupled to the memory, the memory and the one or more processors configured to: determine a device-to-device communication link connection, of a plurality of potential device-to-device communication link connections, of the UE; and provide, for display, a device-to-device communication indicator identifying the device-to-device communication link connection.

In some aspects, a non-transitory computer-readable medium storing a set of instructions for wireless communication includes one or more instructions that, when executed by one or more processors of a user equipment (UE), cause the UE to: determine a device-to-device communication link connection, of a plurality of potential device-to-device communication link connections, of the UE; and provide, for display, a device-to-device communication indicator identifying the device-to-device communication link connection.

In some aspects, an apparatus for wireless communication includes means for determining a device-to-device communication link connection, of a plurality of potential device-to-device communication link connections, of the apparatus; and means for providing, for display, a device-to-device communication indicator identifying the device-to-device communication link connection.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process associated with providing a device-to-device communication indicator, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
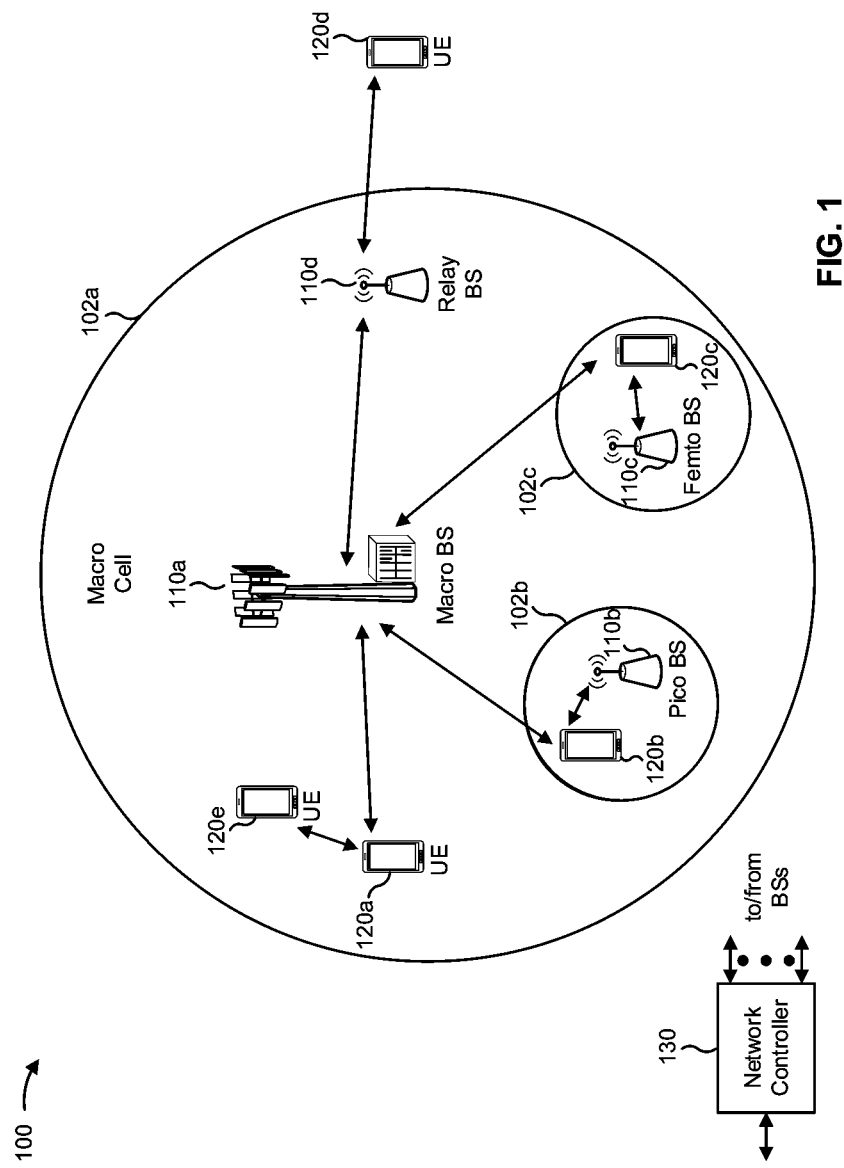
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 megahertz (MHz) to 7.125 gigahertz (GHz), and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
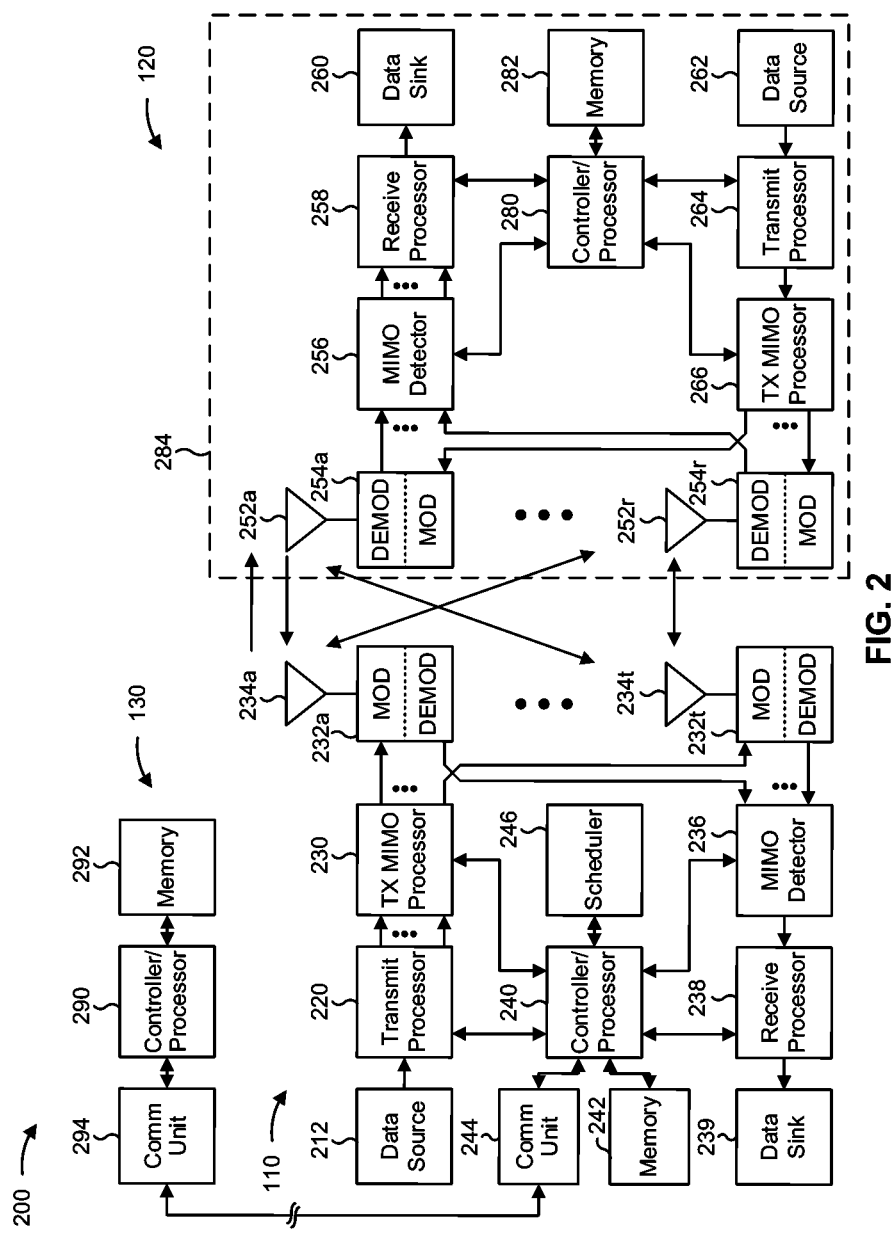
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7A-7C.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7A-7C.

Controller/processor 240 of base station 110, controller/processor 280 of UE 120, and/or any other component(s) of FIG. 2 may perform one or more techniques associated with providing a device-to-device communication indicator, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, interpreting the instructions, and/or the like.

In some aspects, UE 120 may include means for determining a device-to-device communication link connection, of a plurality of potential device-to-device communication link connections, of the UE, means for providing, for display, a device-to-device communication indicator identifying the device-to-device communication link connection, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
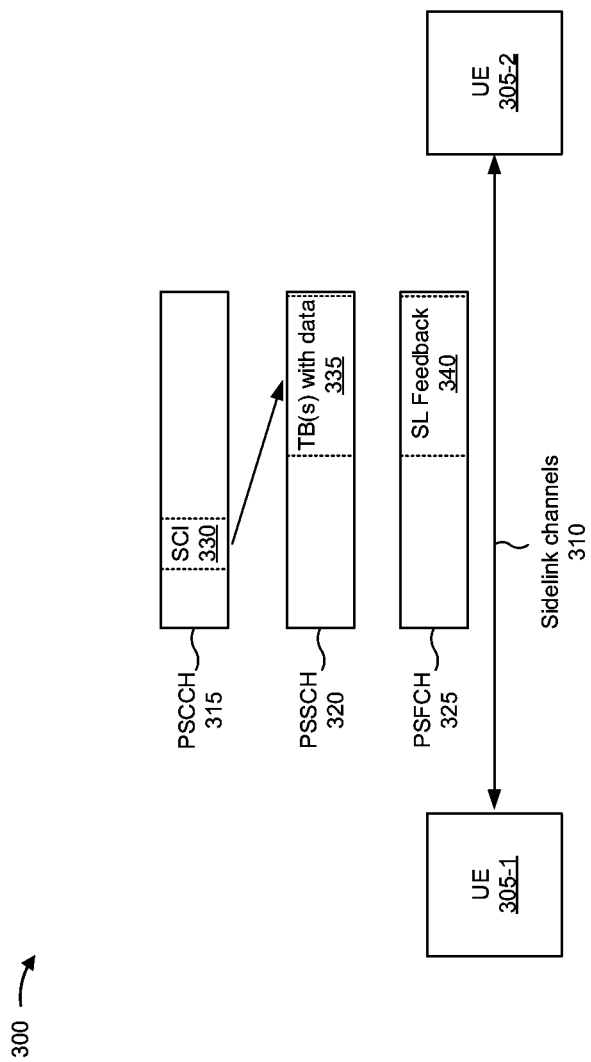
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
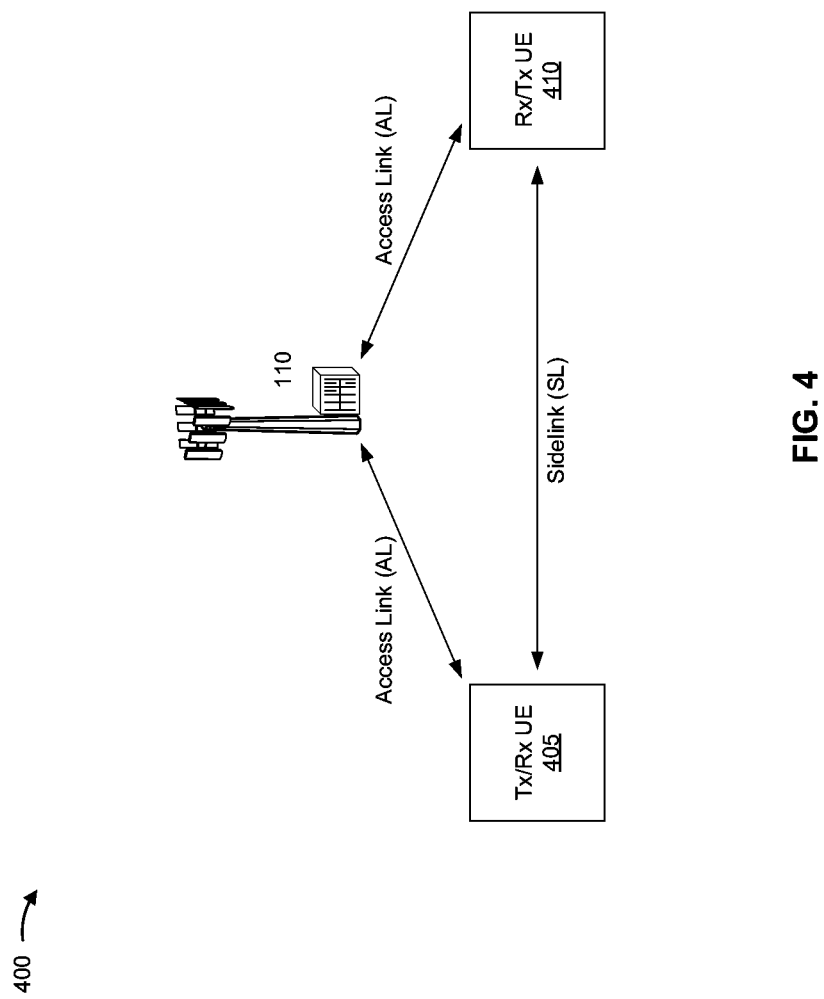
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
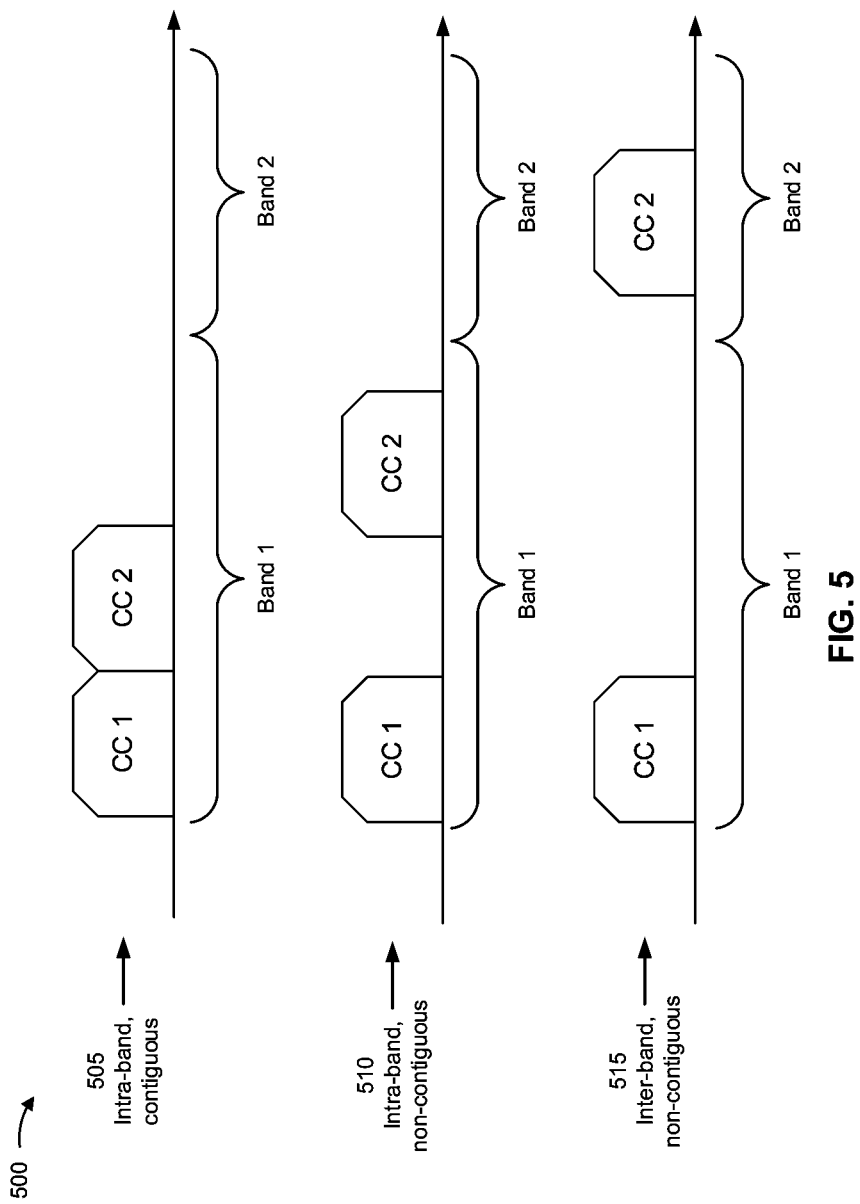
FIG. 5 is a diagram illustrating an example of carrier aggregation, in accordance with various aspects of the present disclosure.

FIG. 5 is a diagram illustrating examples 500 of carrier aggregation, in accordance with various aspects of the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or the like.

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier and one or more secondary carriers. In some aspects, the primary carrier may carry control information (e.g., downlink control information, scheduling information, and/or the like) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 5 is provided as an example. Other examples may differ from what is described with regard to FIG. 5.

Figure 6:
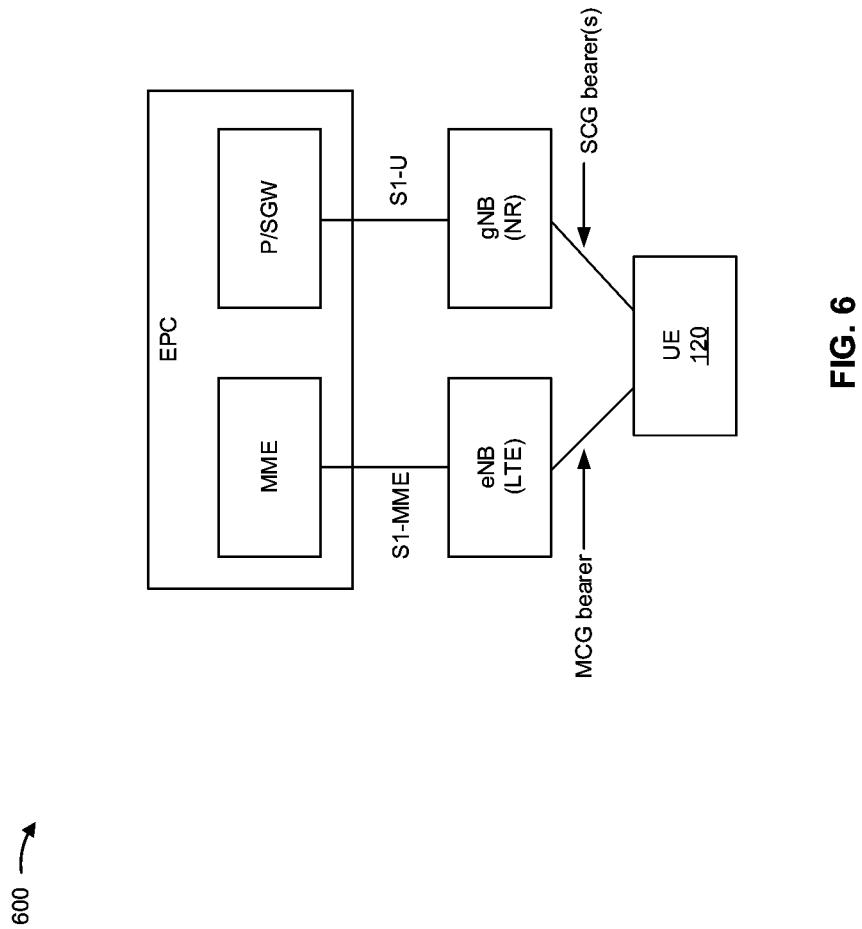
FIG. 6 is a diagram illustrating an example of dual connectivity, in accordance with various aspects of the present disclosure.

FIG. 6 is a diagram illustrating an example 600 of dual connectivity, in accordance with various aspects of the present disclosure. The example shown in FIG. 6 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, a dual connectivity mode may refer to an ENDC mode, a NEDC mode, an NRDC mode, and/or another type of dual connectivity mode.

As shown in FIG. 6, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 6, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 6, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 6 is provided as an example. Other examples may differ from what is described with respect to FIG. 6.

As described above, in some communications systems, UEs may have access to different communication capabilities. For example, a UE may have access to a V2X communication link on an NR network (which may be termed "NR-V2X") or a V2X communication link on an LTE network (which may be termed "C-V2X," "V2X," or "LTE-V2X"). Further, the UE may have access to carrier aggregation (CA) capabilities on, for example, an NR-V2X communication link. Similarly, the UE may have access to other communication link capabilities, such as other sidelink capabilities or other D2D capabilities, depending on, for example, a target device with which the UE is communicating.

Different communication links and communication capabilities may be associated with different communication parameters. For example, NR-V2X may support higher data rates and lower latency relatively to LTE-V2X. Similarly, a UE may communicate using broadcast, multicast, or unicast transmissions on an NR-V2X communication link, but the UE may be limited to broadcast-only transmissions on an LTE-V2X communication link. An availability of different communication links and communication capabilities may be dependent on a location of a UE, a location of other devices (e.g., BSs or other UEs) with which the UE is to communicate, among other examples.

Some aspects described herein enable a UE to provide an indication of available communication links and associated communication capabilities. For example, a UE may determine that a particular communication link, of a plurality of possible communication links, is available and may provide an indicator of the particular communication link for display. In this way, the UE provides a user of the UE with information regarding the particular communication link and/or communication capabilities thereof, thereby enabling the user to use the UE in accordance with available communication capabilities of the particular communication link. For example, when a user is operating a vehicle with a V2X UE and the V2X UE indicates LTE-V2X availability, but not NR-V2X availability, the user may use a smartphone UE, which is indicating NR-V2X availability, for data services, such as navigation services. In this way, indication of available communication links enables greater network efficiency but causing communications to performed using the NR-V2X network. Additionally, or alternatively, when a V2X UE provides an indication that a V2X communication link (e.g., an LTE-V2X or NR-V2X communication link) is active, but a user of the V2X UE is not in a mobility state (e.g., traveling in a vehicle or traveling as a pedestrian), the user may cause the V2X UE to disable the V2X communication link, thereby reducing a utilization of network resources, power resources, or processing resources, among other examples.

Figure 7A:
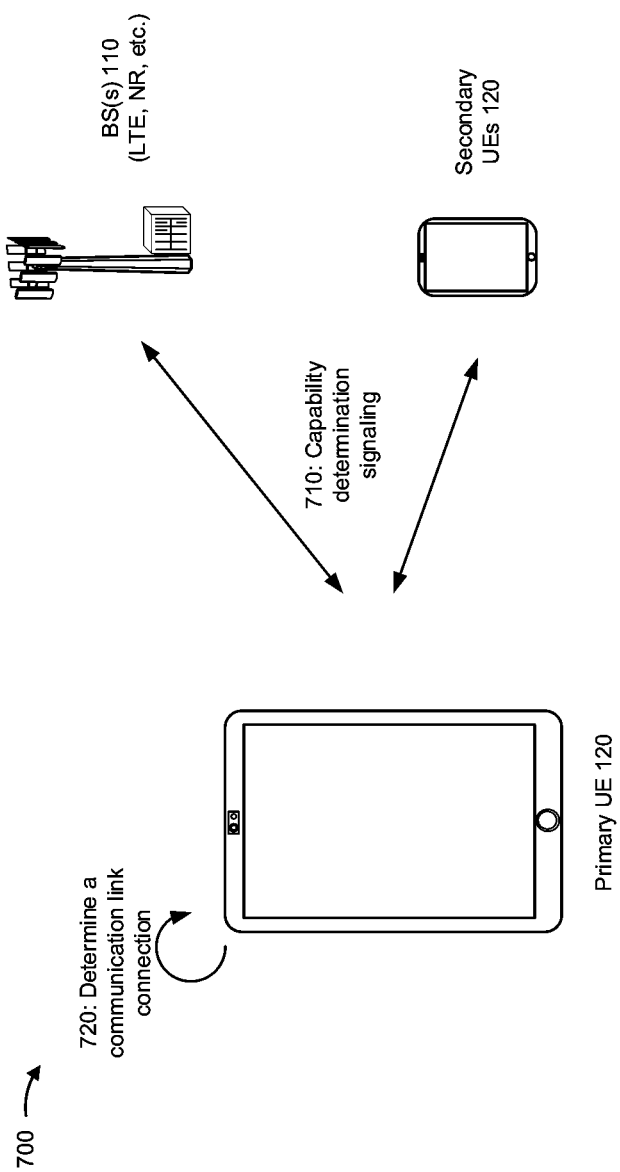
FIGS. 7A-7C are diagrams illustrating an example associated with providing a device-to-device communication indicator, in accordance with various aspects of the present disclosure.
Figure 7B:
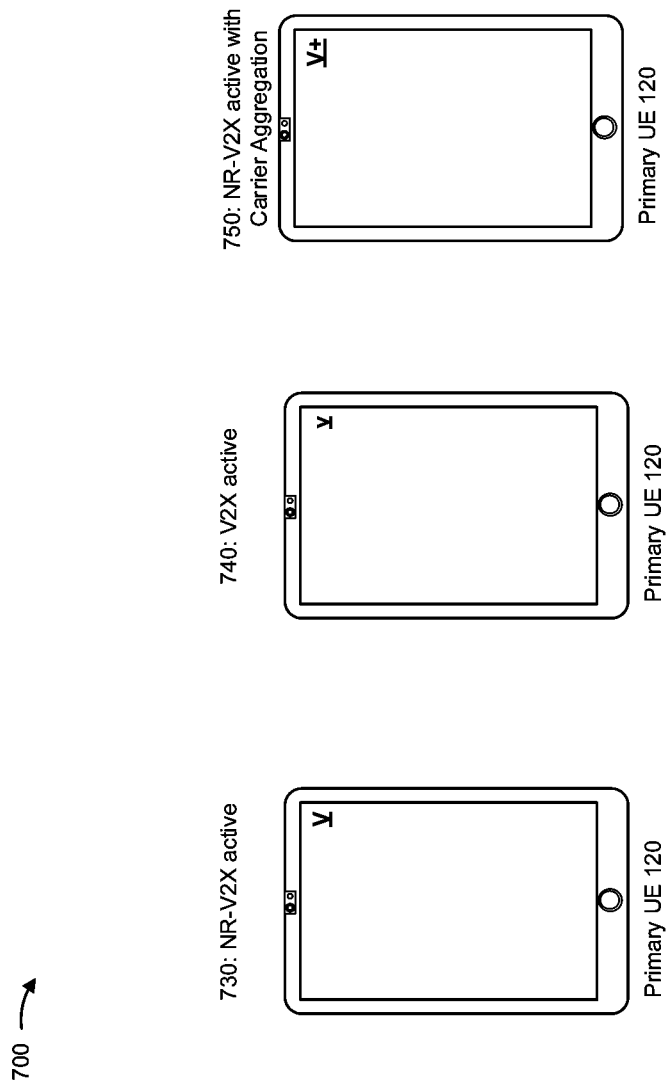
Figure 7C:
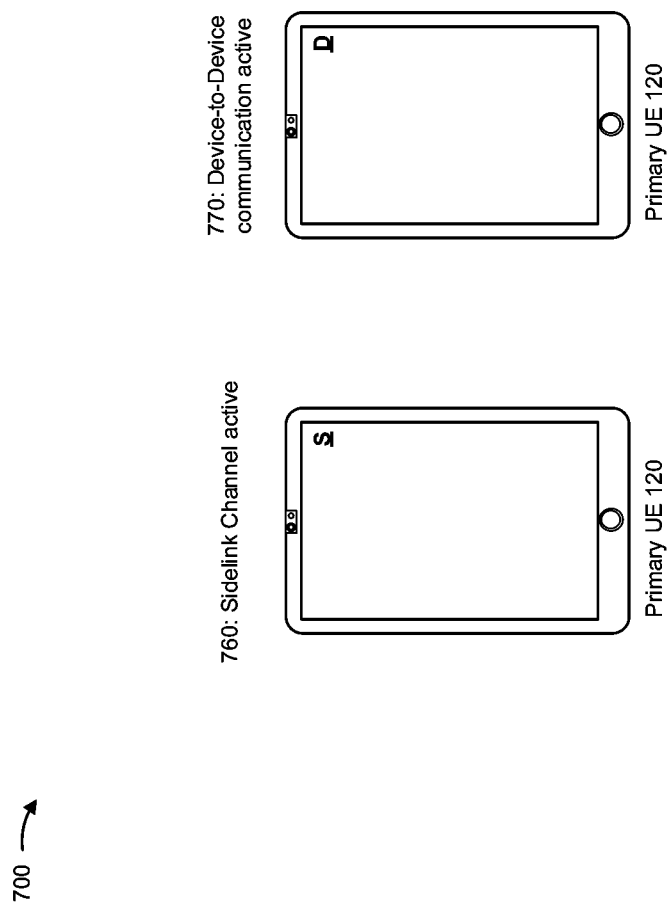

FIGS. 7A-7C are diagrams illustrating an example 700 associated with providing a device-to-device communication indicator, in accordance with various aspects of the present disclosure. As shown in FIG. 7, example 700 includes communication between a primary UE 120 and one or more BSs 110 (e.g., an LTE BS or an NR BS) or one or more secondary UEs 120, among other examples. In some aspects, the one or more BSs 110 and UEs 120 may be included in a wireless network, such as wireless network 100. A BS 110 and a UE 120 may communicate on a wireless access link, which may include an uplink and a downlink. A first UE 120 and a second UE 120 may communicate on a wireless sidelink, as described above.

As shown in FIG. 7A, and by reference numbers 710 and 720, primary UE 120 may communicate with one or more other devices, such as a BS 110 or a secondary UE 120, to determine an availability of one or more communication links and/or associated communication capabilities. For example, when communicating on an NR RAT and in service modes 1 or 3, primary UE 120 may receive a system information block (SIB) type 12 (SIB12) and may transmit a sidelink UE information message (e.g., a "SidelinkUEInformationNR" message) to obtain information about and confirm access to an NR-V2X communication link. In this case, primary UE 120 may provide an indicator of NR-V2X availability for display via a user interface of primary UE 120, as shown in FIG. 7B, and by reference number 730. Similarly, when communicating on the NR RAT and in service modes 1 or 3, primary UE 120 may receive a SIB type 13 (SIB13) and transmit a sidelink UE information message (e.g., a "SidelinkUEInformationEUTRA" message) to obtain information about and confirm access to an LTE-V2X communication link. In this case, primary UE 120 may provide an indicator of V2X availability for display via a user interface of primary UE 120, as shown in FIG. 7B, and by reference number 740. In this way, by providing a first indicator for NR-V2X availability and a second indicator for LTE-V2X availability, primary UE 120 enables a user to determine which communication link primary UE 120 is able to use or is actively using.

Additionally, or alternatively, when communicating on an LTE RAT, primary UE 120 may receive a SIB type 28 (SIB28) and transmit a sidelink UE information message to obtain information about and confirm access to the NR-V2X communication link. In this case, primary UE 120 may provide an indicator of NR-V2X availability for display via a user interface of primary UE 120, as shown in FIG. 7B, and by reference number 730. Similarly, when communicating on the LTE RAT, primary UE 120 may receive a SIB type 18 (SIB18) and transmit a sidelink UE information message to obtain information about and confirm access to the LTE-V2X communication link. In this case, primary UE 120 may provide an indicator of V2X availability for display via a user interface of primary UE 120, as shown in FIG. 7B, and by reference number 740.

Additionally, or alternatively, when in service modes 2 or 4 (e.g., a no service mode), primary UE 120 may obtain sidelink pre-configuration information (e.g., an "SL-PreconfigurationNR" or "SL-Preconfiguration" message), such as from a data structure (e.g., having obtained the pre-configuration information from another device before entering a no-service state). In this case, primary UE 120 may synchronize the sidelink pre-configuration information. For example, primary 120 may perform a synchronization using global navigation satellite systems (GNNS)-based location services or using V2X or V2I synchronization. Additionally, or alternatively, primary UE 120 may identify an availability of a NR-V2X or LTE-V2X communication link and provide a corresponding indicator for display.

In some aspects, primary UE 120 may determine an availability of carrier aggregation. For example, primary UE 120 may communicate with a BS 110 to determine that carrier aggregation is available for an NR-V2X communication link. In this case, primary UE 120 may provide, for display, an indicator of the carrier aggregation capability for the NR-V2X communication link, as shown in FIG. 7B and by reference number 750.

In some aspects, primary UE 120 may determine an availability of another communication link. For example, primary UE 120 may identify an availability of a sidelink with an IoT device or a D2D link with an MTC device. In this case, primary UE 120 may provide an indicator of the sidelink or D2D link via a user interface, as shown in FIG. 7 and by reference numbers 760 and 770, respectively. Although some aspects are described herein in terms of visual user interface notifications for a particular set of communication links, other types of notifications and communication links are possible. For example, primary UE 120 may provide audible notifications, haptic notifications, or other types of visual notifications, among other examples and may provide the notifications for any other type of available communication link. Additionally, or alternatively, primary UE 120 may transmit notifications to other devices. For example, rather than or in addition to providing a visual notification on a display of primary UE 120, primary UE 120 may transmit a notification to a wearable device to cause the wearable device to provide the notification for display.

In some aspects, primary UE 120 may selectively enable use of V2X services. For example, based on providing an indicator of NR-V2X or LTE-V2X services for display, primary UE 120 may receive an indication via a user interface that the UE intends primary UE 120 to use V2X services, such as when the user is a pedestrian. In this case, primary UE 120 may use the V2X communication link to receive and/or transmit V2X messages. Additionally, or alternatively, primary UE 120 may use an automatic V2X operation mode. For example, primary UE 120 may detect a location or speed of primary UE 120 using, for example, a presence of Wi-Fi hotspots (e.g., to determine the location or a speed as UE 120 travels between coverage areas of respective Wi-Fi hotspots). Additionally, or alternatively, primary UE 120 may use an accelerometer (e.g., an integrated accelerometer or an accelerometer of another device, such as a wearable device used by a user of primary UE 120), a microphone (e.g., recording audio data regarding primary UE 120), a camera (e.g., providing image data regarding primary UE 120), or a location module (e.g., a GNSS or global positioning system (GPS) module), among other examples. In this case, based at least in part on detecting the location or speed of primary UE 120, primary UE 120 may determine that a user of primary UE 120 is traveling (e.g., in a vehicle) and may activate use of the V2X communication link.

As indicated above, FIGS. 7A-7C are provided examples. Other examples may differ from what is described with respect to FIGS. 7A-7C.

FIG. 8 is a diagram illustrating an example process 800 performed, for example, by a user equipment (UE), in accordance with various aspects of the present disclosure. Example process 800 is an example where the UE (e.g., UE 120) performs operations associated with device-to-device communication indicator.

As shown in FIG. 8, in some aspects, process 800 may include determining a device-to-device communication link connection, of a plurality of potential device-to-device communication link connections, of the UE (block 810). For example, the UE (e.g., using determination component 908, depicted in FIG. 9) may determine a device-to-device communication link connection, of a plurality of potential device-to-device communication link connections, of the UE, as described above.

As further shown in FIG. 8, in some aspects, process 800 may include providing, for display, a device-to-device communication indicator identifying the device-to-device communication link connection (block 820). For example, the UE (e.g., using notification component 910, depicted in FIG. 9) may provide, for display, a device-to-device communication indicator identifying the device-to-device communication link connection, as described above.

Process 800 may include additional aspects, such as any single aspect or any combination of aspects described below and/or in connection with one or more other processes described elsewhere herein.

In a first aspect, the device-to-device communication link connection is at least one of a Long Term Evolution (LTE)-vehicle-to-everything (V2X) connection or a New Radio (NR)-V2X connection.

In a second aspect, alone or in combination with the first aspect, process 800 includes receiving a system information block, transmitting, based at least in part on receiving the system information block, a UE capability indicator indicating that the UE has a capability for the device-to-device communication link connection, and wherein determining the device-to-device communication link connection comprises determining the device-to-device communication link connection based at least in part on transmitting the UE capability indicator.

In a third aspect, alone or in combination with one or more of the first and second aspects, process 800 includes determining, during a period with a lack of service, a pre-configuration capability, and wherein determining the device-to-device communication link connection comprises determining the device-to-device communication link connection based at least in part on the pre-configuration capability.

In a fourth aspect, alone or in combination with one or more of the first through third aspects, process 800 includes determining whether a channel busy ratio satisfies a threshold, and wherein determining the device-to-device communication link connection comprises determining the device-to-device communication link connection based at least in part on determining whether the channel busy ratio satisfies the threshold.

In a fifth aspect, alone or in combination with one or more of the first through fourth aspects, the device-to-device communication indicator includes at least one of an indicator of a radio access technology, an indicator of a carrier aggregation mode availability, or some combination thereof.

In a sixth aspect, alone or in combination with one or more of the first through fifth aspects, the device-to-device communication link connection is a sidelink connection.

In a seventh aspect, alone or in combination with one or more of the first through sixth aspects, process 800 includes detecting a user interaction with a user interface, and wherein determining the device-to-device communication link connection comprises selecting the device-to-device communication link connection based at least in part on the user interaction with the user interface.

In an eighth aspect, alone or in combination with one or more of the first through seventh aspects, process 800 includes detecting a parameter of the UE, and wherein determining the device-to-device communication link connection comprises selecting the device-to-device communication link connection based at least in part on the parameter of the UE.

In a ninth aspect, alone or in combination with one or more of the first through eighth aspects, the parameter of the UE is at least one of a UE location, a UE mobility state, audio data from a microphone, imaging data from a camera, receiving data from a communication device, or some combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
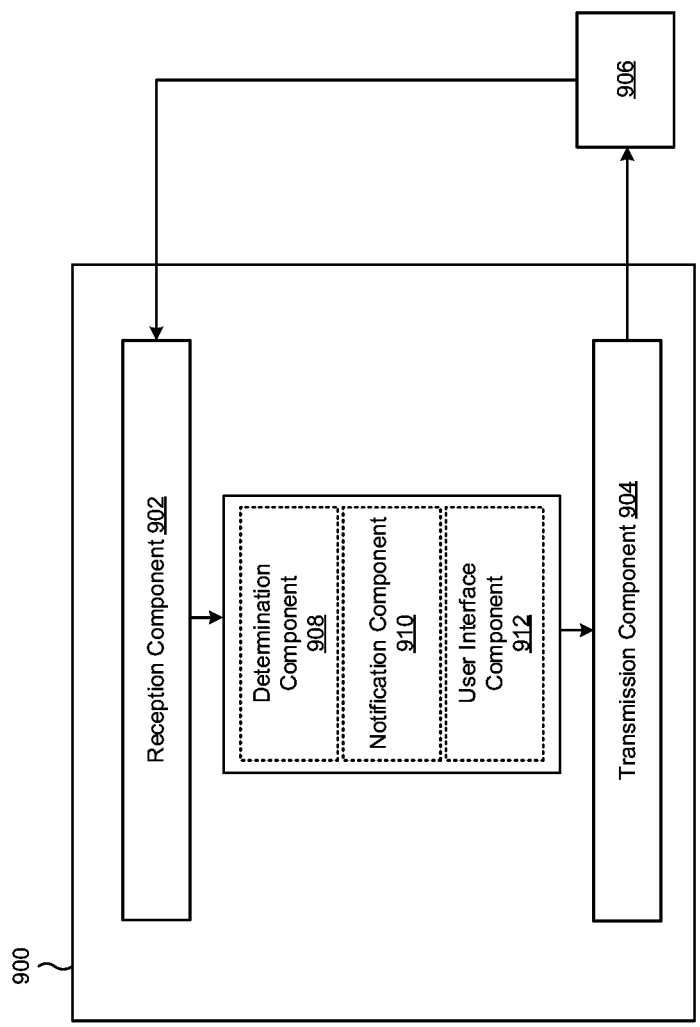
FIG. 9 is a block diagram of an example apparatus for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908, a notification component 910, or a user interface component 912, among other examples.

In some aspects, the apparatus 900 may be configured to perform one or more operations described herein in connection with FIGS. 7A-7C. Additionally, or alternatively, the apparatus 900 may be configured to perform one or more processes described herein, such as process 800 of FIG. 8, among other examples. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2. The reception component 902 may receive a system information block. The transmission component 904 may transmit, based at least in part on receiving the system information block, a UE capability indicator indicating that the UE has a capability for the device-to-device communication link connection.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The determination component 908 may determine a device-to-device communication link connection, of a plurality of potential device-to-device communication link connections, of the UE. The determination component 908 may determine, during a period with a lack of service, a pre-configuration capability. The determination component 908 may determine whether a channel busy ratio satisfies a threshold. The determination component 908 may detect a parameter of the UE, such as a UE location, a UE mobility state, audio data from a microphone, image data from a camera, or received data from a communication device, among other examples. In some aspects, the determination component 908 may include a receive processor, a transmit processor, a controller/processor, a memory, or a combination thereof, of the UE described above in connection with FIG. 2.

The notification component 910 may provide, for display, a device-to-device communication indicator identifying the device-to-device communication link connection. In some aspects, the notification component 910 may include a controller/processor, a memory, a communication interface (e.g., a display, a speaker, or a haptic module, among other examples), a combination thereof, of the UE described above in connection with FIG. 2.

The user interface component 912 may detect a user interaction with a user interface. In some aspects, the user interface component 912 may include a controller/processor, a memory, a communication interface (e.g., a touch-screen display, a keyboard, a microphone, or a gesture-recognition system, among other examples), or a combination thereof, of the UE described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining a device-to-device communication link connection, of a plurality of potential device-to-device communication link connections, of the UE;
   determining an availability of carrier aggregation for the device-to-device communication link connection; and
   providing, for display, a device-to-device communication indicator identifying the device-to-device communication link connection based at least in part the availability of the carrier aggregation.

2. The method of claim 1, wherein the device-to-device communication link connection is at least one of a Long Term Evolution (LTE)-vehicle-to-everything (V2X) connection or a New Radio (NR)-V2X connection.

3. The method of claim 1, further comprising:
   receiving a system information block; and
   transmitting, based at least in part on receiving the system information block, a UE capability indicator indicating that the UE has a capability for the device-to-device communication link connection; and
   wherein determining the device-to-device communication link connection comprises:
      determining the device-to-device communication link connection based at least in part on transmitting the UE capability indicator.

4. The method of claim 1, further comprising:
   determining, during a period with a lack of service, a pre-configuration capability; and
   wherein determining the device-to-device communication link connection comprises:
      determining the device-to-device communication link connection based at least in part on the pre-configuration capability.

5. The method of claim 1, further comprising:
   determining whether a channel busy ratio satisfies a threshold; and
   wherein determining the device-to-device communication link connection comprises:
      determining the device-to-device communication link connection based at least in part on determining whether the channel busy ratio satisfies the threshold.

6. The method of claim 1, wherein the device-to-device communication indicator includes at least one of:
   an indicator of a radio access technology,
   an indicator of a carrier aggregation mode availability, or
   some combination thereof.

7. The method of claim 1, wherein the device-to-device communication link connection is a sidelink connection.

8. The method of claim 1, further comprising:
   detecting a user interaction with a user interface; and
   wherein determining the device-to-device communication link connection comprises:
      selecting the device-to-device communication link connection based at least in part on the user interaction with the user interface.

9. The method of claim 1, further comprising:
   detecting a parameter of the UE; and
   wherein determining the device-to-device communication link connection comprises:
      selecting the device-to-device communication link connection based at least in part on the parameter of the UE.

10. The method of claim 9, wherein the parameter of the UE is at least one of:
    a UE location,
    a UE mobility state,
    audio data from a microphone,
    image data from a camera,
    received data from a communication device, or
    some combination thereof.

11. A user equipment (UE) for wireless communication, comprising:
    a memory; and
    one or more processors coupled to the memory, the one or more processors configured to:
       determine a device-to-device communication link connection, of a plurality of potential device-to-device communication link connections, of the UE;
       determine an availability of carrier aggregation for the device-to-device communication link connection; and
       provide, for display, a device-to-device communication indicator identifying the device-to-device communication link connection based at least in part the availability of the carrier aggregation.

12. The UE of claim 11, wherein the device-to-device communication link connection is at least one of a Long Term Evolution (LTE)-vehicle-to-everything (V2X) connection or a New Radio (NR)-V2X connection.

13. The UE of claim 11, wherein the one or more processors are further configured to:
    receive a system information block; and
    transmit, based at least in part on receiving the system information block, a UE capability indicator indicating that the UE has a capability for the device-to-device communication link connection; and
    wherein the one or more processors, when determining the device-to-device communication link connection, are configured to:
       determine the device-to-device communication link connection based at least in part on transmitting the UE capability indicator.

14. The UE of claim 11, wherein the one or more processors are further configured to:

determine, during a period with a lack of service, a pre-configuration capability; and wherein the one or more processors, when determining the device-to-device communication link connection, are configured to:

determine the device-to-device communication link connection based at least in part on the pre-configuration capability.

15. The UE of claim 11, wherein the one or more processors are further configured to:

determine whether a channel busy ratio satisfies a threshold; and wherein the one or more processors, when determining the device-to-device communication link connection, are configured to:

determine the device-to-device communication link connection based at least in part on determining whether the channel busy ratio satisfies the threshold.

16. The UE of claim 11, wherein the device-to-device communication indicator includes at least one of:

an indicator of a radio access technology, an indicator of a carrier aggregation mode availability, or some combination thereof.

17. The UE of claim 11, wherein the device-to-device communication link connection is a sidelink connection.

18. The UE of claim 11, wherein the one or more processors are further configured to:

detect a user interaction with a user interface; and wherein the one or more processors, when determining the device-to-device communication link connection, are configured to:

select the device-to-device communication link connection based at least in part on the user interaction with the user interface.

19. The UE of claim 11, wherein the one or more processors are further configured to:

detect a parameter of the UE; and wherein the one or more processors, when determining the device-to-device communication link connection, are configured to:

select the device-to-device communication link connection based at least in part on the parameter of the UE.

20. The UE of claim 19, wherein the parameter of the UE is at least one of:

a UE location, a UE mobility state, audio data from a microphone, image data from a camera, received data from a communication device, or some combination thereof.

21. A non-transitory computer-readable medium storing a set of instructions for wireless communication, the set of instructions comprising:

one or more instructions that, when executed by one or more processors of a user equipment (UE), cause the UE to:

determine a device-to-device communication link connection, of a plurality of potential device-to-device communication link connections, of the UE;

determine an availability of carrier aggregation for the device-to-device communication link connection; and provide, for display, a device-to-device communication indicator identifying the device-to-device communication link connection based at least in part the availability of the carrier aggregation.

22. The non-transitory computer-readable medium of claim 21, wherein the device-to-device communication link connection is at least one of a Long Term Evolution (LTE)-vehicle-to-everything (V2X) connection or a New Radio (NR)-V2X connection.

23. The non-transitory computer-readable medium of claim 21, wherein the one or more instructions further cause the UE to:

receive a system information block; and transmit, based at least in part on receiving the system information block, a UE capability indicator indicating that the UE has a capability for the device-to-device communication link connection; and wherein the one or more instructions, that cause the UE to determine the device-to-device communication link connection, cause the UE to:

determine the device-to-device communication link connection based at least in part on transmitting the UE capability indicator.

24. The non-transitory computer-readable medium of claim 21, wherein the one or more instructions further cause the UE to:

determine, during a period with a lack of service, a pre-configuration capability; and wherein the one or more instructions, that cause the UE to determine the device-to-device communication link connection, cause the UE to:

determine the device-to-device communication link connection based at least in part on the pre-configuration capability.

25. The non-transitory computer-readable medium of claim 21, wherein the one or more instructions further cause the UE to:

determine whether a channel busy ratio satisfies a threshold; and wherein the one or more instructions, that cause the UE to determine the device-to-device communication link connection, cause the UE to:

determine the device-to-device communication link connection based at least in part on determining whether the channel busy ratio satisfies the threshold.

26. The non-transitory computer-readable medium of claim 21, wherein the device-to-device communication indicator includes at least one of:

an indicator of a radio access technology, an indicator of a carrier aggregation mode availability, or some combination thereof.

27. The non-transitory computer-readable medium of claim 21, wherein the device-to-device communication link connection is a sidelink connection.

28. An apparatus for wireless communication, comprising:

means for determining a device-to-device communication link connection, of a plurality of potential device-to-device communication link connections, of the apparatus;

means for determining an availability of carrier aggregation for the device-to-device communication link connection; and means for providing, for display, a device-to-device communication indicator identifying the device-to-device communication link connection based at least in part the availability of the carrier aggregation.

29. The apparatus of claim 28, wherein the device-to-device communication link connection is at least one of a Long Term Evolution (LTE)-vehicle-to-everything (V2X) connection or a New Radio (NR)-V2X connection.

30. The apparatus of claim 28, further comprising:
means for receiving a system information block; and
means for transmitting, based at least in part on receiving the system information block, a capability indicator indicating that the apparatus has a capability for the device-to-device communication link connection; and
wherein the means for determining the device-to-device communication link connection comprises:
means for determining the device-to-device communication link connection based at least in part on transmitting the capability indicator.

* * * * *